United States Patent [19]

Takahashi et al.

[11] Patent Number: 5,912,886
[45] Date of Patent: Jun. 15, 1999

[54] DIGITAL MOBILE COMMUNICATION SYSTEM CAPABLE OF ESTABLISHING MUTUAL SYNCHRONIZATION AMONG A PLURALITY OF RADIO BASE STATIONS

[75] Inventors: Hideaki Takahashi; Koji Sugawara, both of Tokyo, Japan

[73] Assignee: NEC Corporation, Tokyo, Japan

[21] Appl. No.: 08/796,951

[22] Filed: Feb. 7, 1997

[30] Foreign Application Priority Data

Feb. 9, 1996 [JP] Japan .................................. 8-023528

[51] Int. Cl.$^6$ ........................................................ H04L 7/00
[52] U.S. Cl. ......................... 370/350; 370/324; 370/516; 370/517; 370/519; 375/355; 375/356
[58] Field of Search ................................. 370/350, 324, 370/503, 516, 517, 519; 375/355, 356

[56] References Cited

U.S. PATENT DOCUMENTS 5,293,380   3/1994   Kondo ..................................... 370/95.3
5,473,668  12/1995   Nakahara ................................. 379/58

FOREIGN PATENT DOCUMENTS 2-238732   9/1990   Japan .
3-224325  10/1991   Japan .
94/18764   8/1994   WIPO .

*Primary Examiner*—William A. Cuchlinski, Jr.
*Assistant Examiner*—Yanel Beaulieu
*Attorney, Agent, or Firm*—Foley & Lardner

[57] ABSTRACT

A mobile communication system is capable of establishing mutual synchronization of radio communication channels among a plurality of radio base stations. A synchronization timing control center is included in a wired telephone network as a terminal equipment of the wired telephone network. Each radio base station in the mobile communication network makes a connection to the synchronization timing control center by way of a mobile switching center, for establishing frame synchronization. Each radio base station measures a value of transmission delay between the radio base station and the synchronization timing control center, and then receives a frame signal as a reference signal from the synchronization timing control center. The formal frame signal to be used by each radio base station is reproduced by compensating the received frame signal by the transmission delay value which varies for each radio base station. Once the frame signal has been established, the signal is held by the clock timing of the network synchronization circuit in each radio base station.

7 Claims, 5 Drawing Sheets

DIGITAL MOBILE COMMUNICATION SYSTEM CAPABLE OF ESTABLISHING MUTUAL SYNCHRONIZATION AMONG A PLURALITY OF RADIO BASE STATIONS

BACKGROUND OF THE INVENTION

1. Field of the Invention

The present invention generally relates to a digital mobile communication system. More specifically, the present invention is directed to a technique for mutually synchronizing radio communication channels among a plurality of radio base stations, through which mobile terminals transmit/receive signals to/from these plural radio base stations.

2. Description of the Prior Art

FIG. 1 schematically illustrates a conceptional diagram of a service area covered by one generic mobile communication system. In this conceptional diagram, symbols BS1 to BS4 indicate radio base stations, and these radio base stations constitute radio communication areas 101 to 104, respectively. When a so-called "hand over" operation is carried out while a mobile terminal under communication is moved from a certain radio communication area to another radio communication area, a problem occurs.

FIG. 2 shows the principle of the problem which will be described below.

Assume now that a mobile terminal is using a time slot (T2) of a radio communication channel through which this mobile terminal is being communicated with a radio base station (BS1) is synchronism with this mobile terminal, and communication channels of BS2 are not synchronized with BS1 but those of BS3 are synchronized with BS1. When this mobile terminal tries to use another time slot (T2' or T2") of another radio communication channel served by another radio base station (BS2 or BS3), this mobile terminal must newly establish the synchronization between BS2 and the own mobile terminal if the hand-over operation is carried out from BS1 to BS2, although such reestablishment of the synchronization is not needed for the hand-over operation from BS1 to BS3. Due to this resynchronizing operation, there is a problem that telephone communications may be interrupted.

As the synchronizing technique among the radio base stations required in the digital mobile communication system, there are disclosed the technique for mutually monitoring radio communication channels among radio base stations to establish synchronization, the technique for receiving a reference clock emitted from a GPS (global positioning system) satellite to establish synchronization, and the technique for establishing synchronization in response to a signal supplied from a wired communication network (telephone network) connected to a mobile communication system. Among these synchronizing techniques, the technique for mutually monitoring the radio communication channels among the radio base stations may have the following difficulties. That is, the signal must be received by employing the transmission slot, and since the C/N (receive carrier-to-noise ratio) is not sufficient, depending upon the distance between the own radio base station and the counter radio base station, erroneous synchronization will occur. Also, the synchronizing to technique with employment of the GPS satellite owns such a problem that since the receiver apparatus capable of receiving the GPS signal must be assembled into all of the radio base stations, these radio base stations require large-scale and expensive facilities. Furthermore, this GPS type synchronizing technique owns another problem that the GPS electromagnetic waves may not be received, depending on the installation places of the radio base stations, such as places located behind buildings along the GPS signal receiving direction.

The above-described synchronizing technique in response to the signal supplied from the wired communication network is described in, for instance, Japanese Laid-open Patent Application No. 2-238732, and No. 3-224325.

In accordance with the synchronizing technique described in Japanese Laid-open Patent Application No. 2-238732, the timing information is sent out as the reference from the switching unit for constituting the mobile switching network to each of the radio base stations. In the respective radio base stations, when one mobile terminal under communication with another radio base station issues a demand to switching the communication from this radio base station to the own radio base station, the up-link radio signal of this mobile terminal which is now communicated with another radio base station is monitored, and the timing for constituting the reference, supplied from the switching unit, is newly matched with the timing for communication purpose in response to the monitored timing.

As indicated in FIG. 3, the synchronizing technique described in Japanese Laid-open Patent Application No. 3-224325 is realized by arranging the synchronization signal generating apparatus 6 in combination with the control station 1. Then, the radio base stations (BS) 3-a and 3-b are provided under control of the control station 1, and the delay amount adjusting apparatuses 7-a and 7-b are arranged in combination with these radio base stations (BS). The synchronization is established between the base stations since the reset pulses sent from the synchronization signal generating apparatus 6 reaches all of the base stations under control of the control station 1 at the same time. To this end, the transmission delays depending on the transmission paths from the control station 1 to the respective base stations are measured in advance, and the adjustment values are set to the delay adjusting apparatuses 7-a and 7-b provided in combination with the respective base stations so as to make the delay amounts to the respective base stations constant. As a consequence, the reset pulses can be simultaneously supplied to all of the base stations.

The above-described conventional synchronizing technique described in Japanese Laid-open Patent Application No. 2-238732 owns the following problems. That is, the radio base station has to monitor the radio communication channel used by the mobile terminal, which is currently communicating with another radio base station and will perform the hand over operation, for establishing the synchronization by the reference timing received from the switching unit. Every time the synchronization is established, the radio base station requires the monitoring control, resulting in increasing of the load given to the radio base station. Moreover, although the synchronization can be established between the own radio base station and the counter radio base station monitored by the mobile terminal, the synchronization cannot be secured between the own radio base station and other adjoining radio base stations.

Also, the above-mentioned conventional synchronizing technique disclosed in Japanese Laid-open Patent Application No. 3-224325 has the following drawbacks. That is, the delay amounts are previously measured which are set to the delay adjusting apparatuses employed in the respective radio base stations, and these measured delay amounts are set by making telephone instructions to the respective radio base stations. Under such circumstances, in a large-scale mobile communication network, a lengthy delay-amount measuring time is necessarily required in order that the reset pulses should reach all of the radio base stations at the same time, and further the cumbersome delay-amount setting sequential operations are required.

In addition, any of the above-described conventional synchronizing techniques are directed to the synchronization establishment among the radio base stations under control of the mobile communication controlling switching unit provided within the own mobile communication network, but not directed to the synchronization establishment between the radio base station of the own mobile communication network and another radio base station of a mobile communication network different therefrom. As a consequence, even when a plurality of mobile communication networks managed by plural mobile communication utilities are provided in adjacent areas and these mobile communication utilities have allowed roaming, if one mobile terminal tries to use another mobile communication network of the different mobile communication utility, then the synchronization must be reestablished. Thus, a telephone communication is instantaneously interrupted when the mobile communication networks are switched.

SUMMARY OF THE INVENTION

The present invention has been made to solve the above-described problems, and has an object to provide a technique capable of establishing synchronization not only between radio base stations under control of one mobile communication control switching unit, but also between radio base stations belonging to mobile communication networks of different mobile communication utilities.

To achieve the above-described object, a digital mobile communication system for performing a communication between a radio base station and a mobile station by employing a time slot of digitalized and time-divided the radio communication channel signal, according to an aspect of the present invention, comprises a synchronization timing control center provided in a wired communication network connected to a digital mobile communication network through a mobile switching center, for sending out a frame pulse which constitutes a reference used to synchronize the radio communication channels of the respective radio base stations within said digital mobile communication network.

This radio base station is featured by employing:
1). call connection control means for controlling an establishment of call connection with the synchronization timing control center;
2). transmission delay amount measuring means for measuring a transmission delay of a connection path established to the synchronization timing control center; and
3). synchronization signal producing means for receiving a reference frame pulse sent out from the synchronization timing control center and for correcting the reference frame pulse based on the transmission delay amount measured by the transmission delay amount measuring means to thereby produce a radio communication channel synchronization signal.

In the above-described digital mobile communication network, the radio base station being connected to the mobile switching center is featured by extracting a network synchronized pulse supplied from the mobile switching center to thereby use the extracted network-synchronized pulse as an operation clock of the own radio base station, and by holding the radio communication synchronization signal produced by the synchronization signal producing means in response to the operation clock.

Furthermore, the synchronization timing control center includes signal turning back means, and the transmission delay amount measuring means in the radio base station is featured by including:
1). first bit pattern signal transmission means for transmitting a first bit pattern signal to the synchronization timing control center when the connection path is established to the synchronization timing control center;
2). first bit pattern signal detecting means for detecting the first bit pattern signal returned by the signal turning back means;
3). delay time measuring means for measuring time defined from time when the first bit pattern signal transmission means transmit the first bit pattern signal up to time when the first bit patterns signal detecting means detects the first bit pattern signal being returned; and
4). delay amount correcting means for judging a half of the delay time measured by the delay time measuring means as a transmission delay amount.

The above-described synchronization timing control center further comprises switching means and second bit pattern signal transmission means; and the switching means switches the second bit pattern signal transmission means to a connection path when the connection is required from the radio base station after the turning back means is connected to the connection path and predetermined time has passed.

The above-described second bit pattern signal corresponds to a frame pulse as a synchronization reference of the radio communication channel; and the synchronization signal producing means includes second bit pattern signal detecting means for detecting the second bit pattern signal, and produces a radio communication channel synchronization signal at such timing produced by correcting the frame timing detected by the second bit pattern signal detecting means based upon the transmission delay amount judged by the delay amount compensating means, and also holds the timing of the radio communication channel in response to the operation clock.

BRIEF DESCRIPTION OF THE DRAWINGS

A more complete understanding of the teachings of the present invention may be acquired by referring to the accompanying drawings, in which.

DETAILED DESCRIPTION OF THE PREFERRED EMBODIMENTS

Referring now to drawings, a digital mobile communication system according to an embodiment of the present invention will be described.

Figure 1:
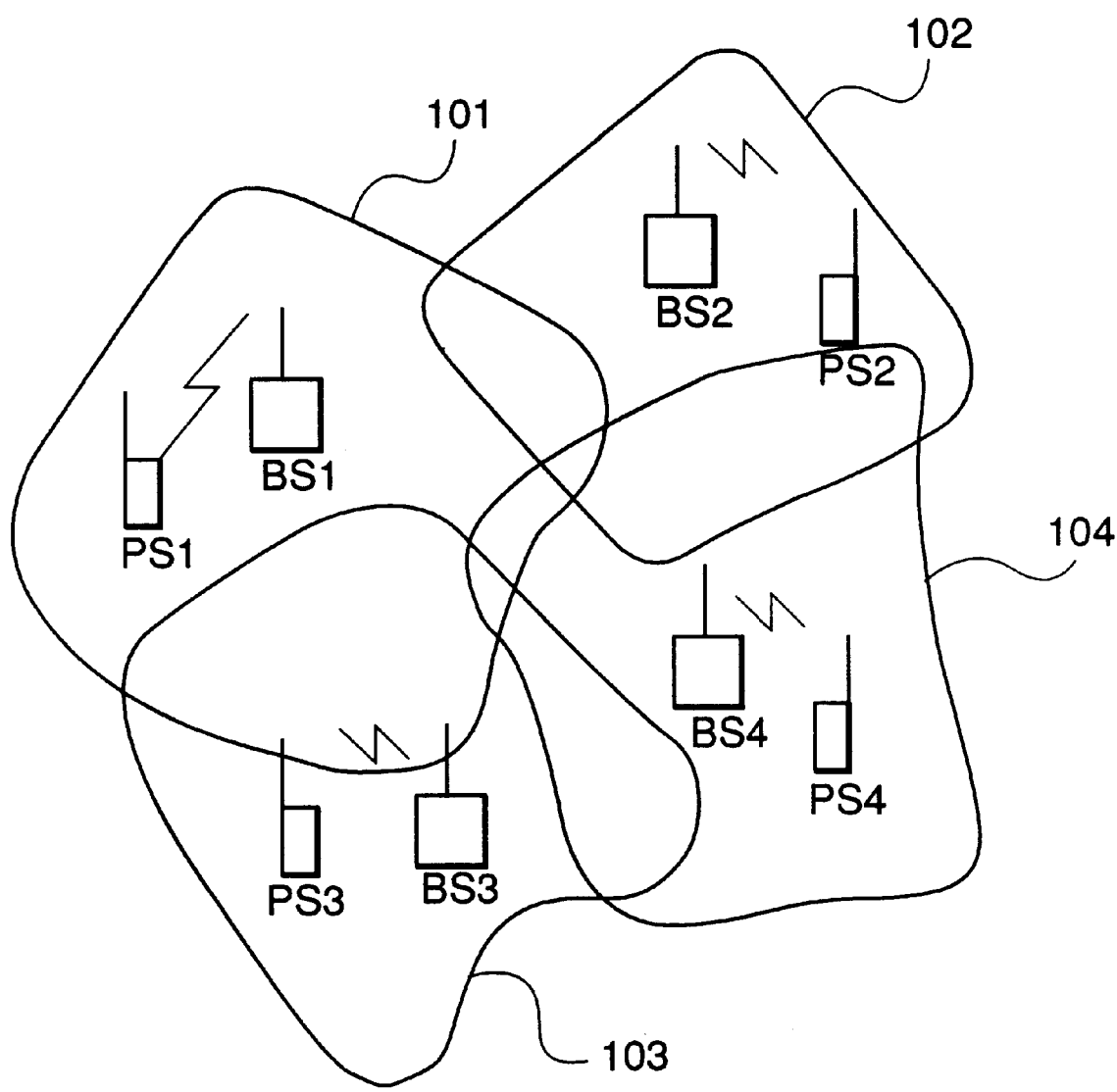
FIG. 1 schematically shows a conceptional drawing of an arrangement of one generic mobile communication network.
Figure 2:
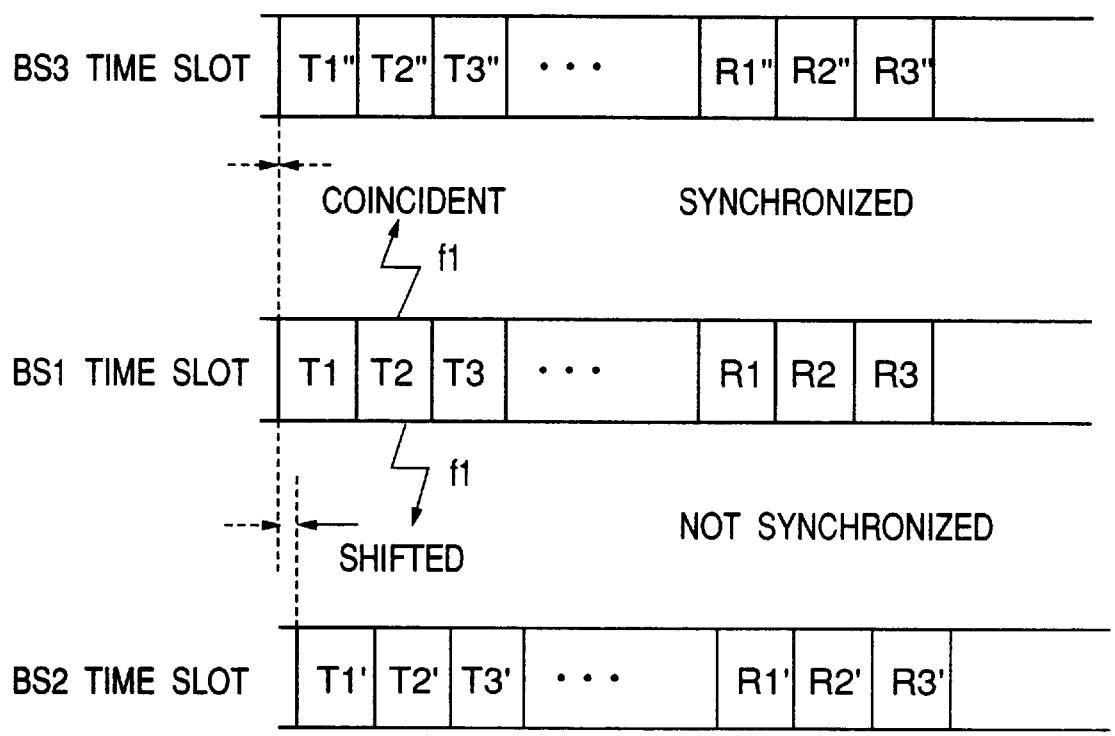
FIG. 2 schematically indicates a conceptional drawing for explaining necessities of synchronization in radio communication channels in a typical mobile communication system.
Figure 3:
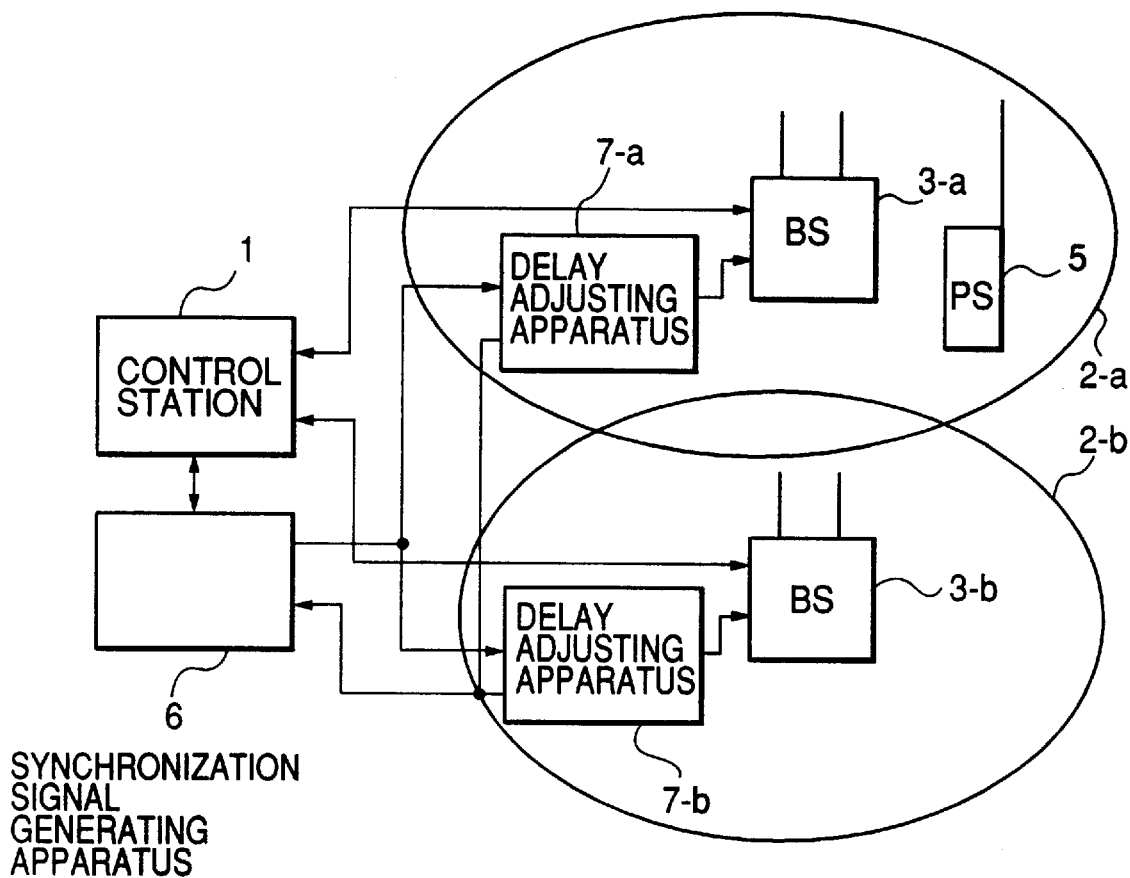
FIG. 3 is a schematic block diagram for representing a conventional synchronizing system for the mobile communication network.
Figure 4:
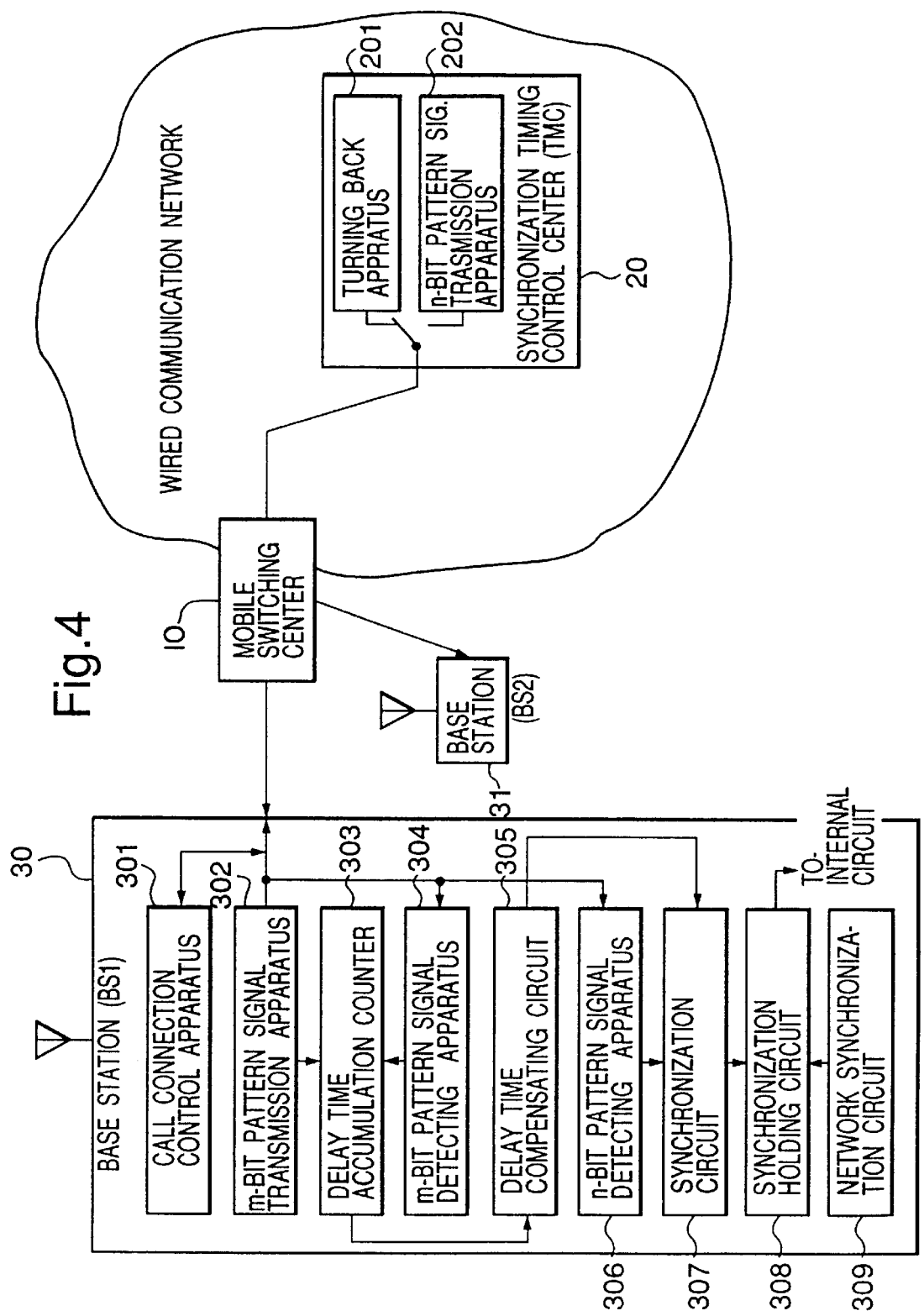
FIG. 4 is a schematic block diagram for indicating arrangements of radio base stations of a mobile communication network and of synchronization timing control station installed in a wired communication network, employed in a digital mobile communication system according to an embodiment of the present invention.

FIG. 4 is a schematic block diagram for representing an arrangement of a digital mobile communication system, according to an embodiment of the present invention, which employs radio base stations (BSs) and a synchronization timing control center (TMC). A feature of the present invention is such that a TMC is provided within a wired communication network, independently from a mobile communication network, and this TMC sends out synchronizing pulses used to establish a synchronization in radio communication channels in the respective radio base stations. Concretely speaking, FIG. 4 represents a mobile communication network and a wired communication network. In this mobile communication network, a plurality of radio base stations (typically indicated by radio base station 30(BS1)) and 31(BS2) are connected to a mobile switching center 10 functioning as an interface point (gate) between the mobile communication network and the wired communication network. In the wired communication network, a synchronization timing control center (TMC) 20 is installed.

Each of these radio base stations 30 and 31 extracts a clock of the wired communication network via the mobile switching center 10 to thereby acquire the network synchronization. In this embodiment, it is assumed that the frequency of this clock is stable unless the clock derived from this wired communication network may slip, and this clock owns a sufficiently large time constant with respect to an instantaneous interruption (several milliseconds) of the line.

In accordance with the basic idea of the present invention, each of these radio base stations accesses to the TMC 20, and then receives the synchronizing pulse sent from the TMC 20, so that the respective radio base stations may establish the synchronization of radio communication channels in response to this synchronizing pulse. In this case, a specific consideration is required as to a difference in transmission path delays of lines connected between the TMC 20 and the respective radio base stations. As a consequence, the digital mobile communication system according to the present invention is arranged so that this transmission path delay in each of the radio base station is measured, and after the delay amounts are corrected, the synchronizing operation is carried out.

The operations of the digital mobile communication system according to the embodiment of the present invention will now be explained more in detail with reference to FIG. 4 and FIG. 5.

That is, in the system according to this embodiment, the operations are performed based on the following three phases:

1). Measurement of Line Delay Amount.
2). Establishment of Synchronization.
3). Holding of Synchronization.

A first description will now be made of the phase 1), i.e., measurement of line delay amount.

As previously described, in accordance with the present invention, the timing of the respective radio communication channels is made coincident with each other in conformity to the timing (frame timing) of the synchronizing pulse sent from the TMC 20. In this case, the time when the radio base station actually receives the frame timing sent from the TMC 20 is delayed by such a delay amount defined by the delay produced in the transmission path between this radio base station and the TMC. This delay amount will differ from each other in each of the radio base stations, and also in the signal path established within the wired communication network during the access operation even in the same radio base station. Accordingly, before establishing the synchronization, each of the radio base stations measures this delay amount, and thereafter establishes the synchronization in response to such frame timing corrected based on the measured delay amount.

In this embodiment, firstly, the radio base station 30 is connected to the TMC 20 installed in the wired communication network in such a manner that a call is originated from a call connection control apparatus 301 to the TMC 20. This connection operation is carried out by the wired communication network in such a manner that either a subscriber number or a specific number used in the wired communication network is allocated to the TMC, and then each of the radio base stations transmits this subscriber number or the specific number to the wired communication network. This connection operation may be alternatively carried out by employing another method that while the TMC holds an access number within the mobile communication network of the respective radio base stations, the TMC periodically accesses to each radio base station one by one, not by employing the above method that the radio base station accesses to the TMC 20.

The radio base station 30 connected to the TMC 20 transmits an m-bit pattern signal from a transmitter apparatus 302 to a transmission path in order to measure a delay in the transmission path.

Figure 5:
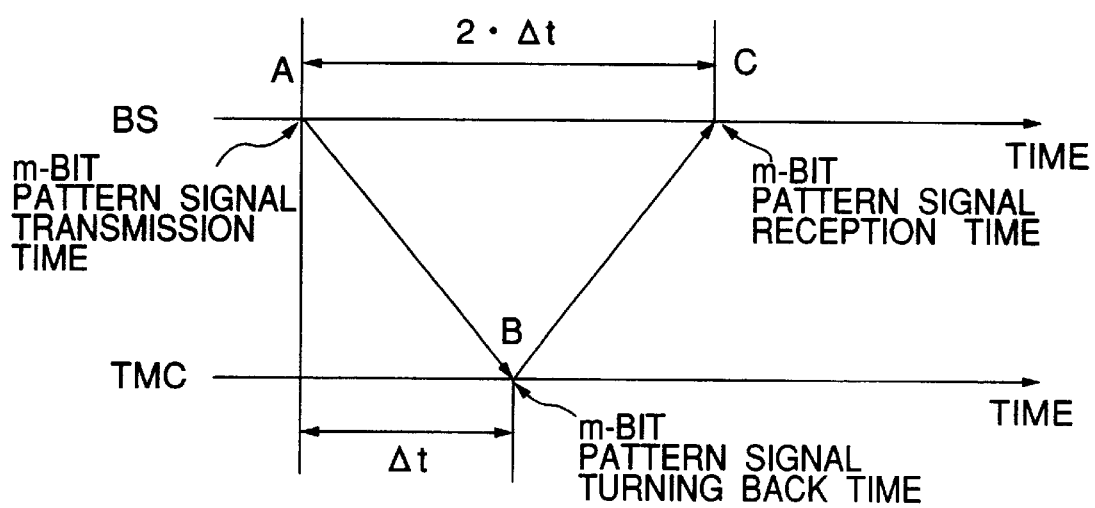
FIG. 5 is a time chart for describing a basic idea used to measure a transmission delay amount employed in the digital mobile communication system according to the embodiment of the present invention.

In FIG. 5, time is indicated by symbol "A", at which a radio base station denoted by "BS" sends out the m-bit pattern signal. The m-bit pattern signal sent from the radio base station is transmitted through the transmission path, and then reaches the synchronization timing control station expressed by "TMC" after time "$\Delta t$" has elapsed. This reaching time is expressed as "B". In the TMC, the line is connected to a turning back apparatus 201, and the m-bit pattern signal reached from the radio base station is turned back by this turning back apparatus, so that the turned m-bit pattern signal is directed through the same transmission path to the radio base station. After the time "$\Delta t$" has passed, the m-bit pattern signal returned by the TMC reaches the radio base station. In FIG. 5, time during which the n-bit pattern signal sent from the radio base station is turned back from the TMC, and then is returned to the radio base station is represented by "C". The m-bit pattern signal which has been returned to the radio base station is detected by an m-bit detecting apparatus 304 of the radio base station. A delay time accumulation counter 303 counts up a difference between the time during which the m-bit pattern signal transmission apparatus transmits the m-bit pattern signal and the time during which the returned m-bit pattern signal is detected by the m-bit pattern signal detecting circuit. Based on this counted value, a delay amount compensating circuit 305 calculates delay time between the radio base station and the TMC, and then stores the calculated delay time. As apparent from FIG. 5, the time difference (C−A)=2×$\Delta t$ corresponds to the reciprocating delay time, the time "$\Delta t$" obtained by dividing this reciprocating delay time by ½ corresponds to the actual delay time.

Next, a description will now be made of the establishing phase of the synchronization.

After the TMC is accessed from the radio base station and has taken such timing that the turning back operation of the m-bit pattern signal used to measure the delay time is accomplished, this TMC switches the line to be connected to an n-bit pattern signal transmission apparatus 202. From the n-bit pattern signal transmission apparatus 202 switched to the line, an n-bit pattern signal is sent out at frame timing constituting a synchronization reference. In the radio base station, the n-bit pattern signal sent from this TMC is detected by an n-bit pattern signal detecting apparatus 306, and the frame timing received is stored. The frame timing which has been detected by the n-bit pattern signal detecting apparatus 306 to be stored is corrected based upon the delay time Δt stored in the delay amount correcting circuit 305. Thereafter, the formal frame timing is reproduced from this delay-corrected frame timing, and thus is used as the synchronization timing of the radio communication channel used by this radio base station.

In this manner, the timing corrected by the delay amount specific to each of these radio base stations in the respective radio base stations may be synchronized with all of the signals sent from the TMC.

The synchronization established in this manner holds the timing inside this radio base station by extracting the clock supplied from the mobile switching center 10 and by utilizing the clock supplied from a network synchronizing circuit 309 by a synchronization holding circuit 308. This network synchronizing circuit 309 is synchronized with the network. As a consequence, when the circuits are once self-operated within the radio base station, the radio base station no longer holds the line between the TMC and the own radio base station. Accordingly, the call connection control apparatus 301 disconnects the transmission line connected to the TMC.

Although not shown in the drawing, when an out-of-synchronization phenomenon is detected by way of a synchronization confirming circuit and the like, which are separately installed, the above-described control operation by measuring the line delay amount is repeated, so that the synchronization can be maintained. Even when such a synchronization confirming circuit is not equipped in the digital mobile communication system, if such a control program is employed, then the synchronization can be readily maintained within the mobile communication network. This control program may be regularly executed, for example once per several days, in which the line delay amount is measured, the synchronization is established, and is maintained in accordance with the present invention.

Also, since the TMC is installed in the wired communication network independently from the mobile communication network, when not only a specific mobile communication utility, but also a plurality of mobile communication utilities which have made up a contract with each other employ this TMC as a common reference timing generating source, the synchronization can be established in the mobile communication networks of the plural communication utilities.

The digital mobile communication system according to the present invention owns such an advantage that since the TMC is employed as one access apparatus of the wired communication network provided independent from the mobile communication network, the synchronization can be established not only in the same mobile communication network, but also between the mobile communication networks provided by the different communication utilities. Furthermore, since the frame timing is self-oscillated and held in the radio base station synchronized with the network, if the synchronization is once established, then the timing supplied from the TMC is no longer continuously received. Moreover, there is another advantage that when the out-of-synchronizing condition occurs, the synchronization can be easily reestablished. As a consequence, when the hand over operation is carried out, establishing of the synchronization is not required, so that the controlling load given to the radio base station can be reduced.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. A digital mobile communication system for performing a communication between a radio base station and a mobile station by a time division multiple access (TDMA) system, said digital mobile communication system comprising:

a synchronization timing control center installed in a wired telephone network connected to a digital mobile communication network through a mobile switching center having an identification number as a terminal equipment within the wired telephone network, for sending out a frame pulse which constitutes a reference used to synchronize radio communication channels of the radio base station within said digital mobile communication network; and said radio base station includes:

a call connection control unit for controlling an establishment of call connection with said synchronization timing control center by using said identification number allocated to said mobile switching center within said wired telephone network;

a transmission delay amount measuring unit for measuring a transmission delay of a connection path established to said synchronization timing control center; and a synchronization signal producing unit for receiving a reference frame pulse sent out from said synchronization timing control center and for correcting said reference frame pulse based on the transmission delay amount measured by said transmission delay amount measuring unit to thereby produce a radio communication channel synchronization signal.

2. A digital mobile communication system as claimed in claim 1 wherein said radio base station being connected to said mobile switching center further comprises:

a network synchronization circuit for extracting a network synchronized pulse supplied from said mobile switching center; and a synchronization holding circuit for using the extracted network-synchronized pulse as an operation clock of the radio base station, and holding the radio communication synchronization signal produced by said synchronization signal producing unit in response to said operation clock.

3. A digital mobile communication system as claimed in claim 1, wherein said synchronization timing control center is located separate from said mobile switching center, and wherein communications between said synchronization timing control center and said mobile switching center is provided only by way of said wired telephone network.

4. A digital mobile communication system for performing a communication between a radio base station and a mobile station by a time division multiple access (TDMA) system, said digital mobile communication system comprising:

a synchronization timing control center installed in a wired communication network connected to a digital mobile communication network through a mobile switching center, for sending out a frame pulse which constitutes a reference used to synchronize radio communication channels of the radio base station within said digital mobile communication network; and said radio base station includes:
- a call connection control unit for controlling an establishment of call connection with said synchronization timing control center;
- a transmission delay amount measuring unit for measuring a transmission delay of a connection path established to said synchronization timing control center;
- a synchronization signal producing unit for receiving a reference frame pulse sent out from said synchronization timing control center and for correcting said reference frame pulse based on the transmission delay amount measured by said transmission delay amount measuring unit to thereby produce a radio communication channel synchronization signal;
- a network synchronization circuit for extracting a network synchronized pulse supplied from said mobile switching center; and
- a synchronization holding circuit for using the extracted network-synchronized pulse as an operation clock of the radio base station, and holding the radio communication synchronization signal produced by said synchronization signal producing unit in response to said operation clock, wherein:
said synchronization timing control center includes a signal turning back unit; and
said transmission delay amount measuring unit includes:
- a first bit pattern signal transmission unit for transmitting a first bit pattern signal to said synchronization timing control center when said connection path to said synchronization timing control center is being established;
- a first bit pattern signal detecting unit for detecting said first bit pattern signal returned by said signal turning back unit in said synchronization timing control center;
- a delay time measuring unit for measuring time defined from a time when said first bit pattern signal transmission unit transmits said first bit pattern signal up to a time when said first bit pattern signal detecting unit detects said first bit pattern signal returned by said signal turning back unit; and
- a delay amount correcting unit for judging a half of the delay time measured by said delay time measuring unit as a transmission delay amount.

5. A digital mobile communication system as claimed in claim 3, wherein: said synchronization timing control center further comprising:
- a second bit pattern signal transmission unit for transmitting a second bit pattern signal; and
- a switching unit for switching said connection path being established by said radio base station to said second bit pattern signal transmission unit from said signal turning back unit after a predetermined time has passed since said connection path establishment.

6. A digital mobile communication system as claimed in claim 4, wherein said second bit pattern signal corresponds to a frame pulse as a synchronization reference of the radio communication channel, and said synchronization signal producing unit further comprises:
- a second bit pattern signal detecting unit for detecting said second bit pattern signal for producing a radio communication channel synchronization signal based upon the transmission delay amount judged by said delay amount correcting unit.

7. A method for performing a communication between a radio base station and a mobile station by a time division multiple access (TDMA) system, said method comprising:
sending out, via a synchronization timing control center installed in a wired telephone network, the synchronization timing control center being communicatively connected to a digital mobile communication network through a mobile switching center having an identification number within the wired telephone network, a frame pulse which constitutes a reference used to synchronize radio communication channels of said radio base station within said TDRA system;
controlling, by said radio base station, an establishment of call connection with said synchronization timing control center by using said identification number allocated to said mobile switching center within said wired telephone network;
measuring, by said radio base station, a transmission delay of a connection path established to said synchronization timing control center;
receiving, by said radio base station, a reference frame pulse sent out from said synchronization timing control center; and
correcting, by said radio base station, said reference frame pulse based on the measured transmission delay amount to thereby produce a radio communication channel synchronization signal.

* * * * *